United States Patent
Huang

(10) Patent No.: US 9,104,819 B2
(45) Date of Patent: Aug. 11, 2015

(54) MULTI-MASTER BUS ARCHITECTURE FOR SYSTEM-ON-CHIP

(75) Inventor: Bobby Huang, Shanghai (CN)

(73) Assignee: ST-Ericsson SA, Plan-les-Ouates (CH)

( * ) Notice: Subject to any disclaimer, the term of this patent is extended or adjusted under 35 U.S.C. 154(b) by 463 days.

(21) Appl. No.: 13/509,945

(22) PCT Filed: Nov. 16, 2010

(86) PCT No.: PCT/EP2010/067545
§ 371 (c)(1),
(2), (4) Date: Nov. 5, 2012

(87) PCT Pub. No.: WO2011/061172
PCT Pub. Date: May 26, 2011

(65) Prior Publication Data
US 2013/0046909 A1    Feb. 21, 2013

(30) Foreign Application Priority Data
Nov. 18, 2009 (CN) .......................... 2009 1 0221860

(51) Int. Cl.
*G06F 13/00* (2006.01)
*G06F 13/40* (2006.01)
*G06F 13/364* (2006.01)

(52) U.S. Cl.
CPC .......... *G06F 13/4022* (2013.01); *G06F 13/364* (2013.01)

(58) Field of Classification Search
USPC .................................. 710/104–119, 305–317
See application file for complete search history.

(56) References Cited

U.S. PATENT DOCUMENTS

| | | | | |
|---|---|---|---|---|
| 6,138,185 A * | 10/2000 | Nelson et al. | | 710/33 |
| 6,633,946 B1 * | 10/2003 | Hendel | | 710/317 |
| 7,882,278 B2 * | 2/2011 | Chadha et al. | | 710/29 |
| 8,006,021 B1 * | 8/2011 | Li et al. | | 710/306 |
| 8,041,867 B2 * | 10/2011 | Lin | | 710/110 |
| 8,549,207 B2 * | 10/2013 | Satpathy et al. | | 710/317 |
| 2007/0126474 A1 | 6/2007 | Chang | | |
| 2008/0235431 A1 * | 9/2008 | Boyd et al. | | 710/317 |
| 2011/0138098 A1 * | 6/2011 | Satpathy et al. | | 710/317 |

FOREIGN PATENT DOCUMENTS

WO    03014948 A1    2/2003

* cited by examiner

*Primary Examiner* — Raymond Phan
(74) *Attorney, Agent, or Firm* — Coats & Bennett, PLLC

(57) ABSTRACT

A system on chip and associated method facilitates transfer of data between two or more master blocks through a bus on chip. The system creates a direct path for data transferring from a master port of a bus to another master port of the same bus. The bus includes a plurality of signals used to transfer data, address or control information between two or several blocks on chip. The behavior of bus connector block is controlled according to the destination of data coming from a master port. The system includes a master-connector-slave arrangement that enables the direct data communication between two or several master blocks, without taking any slave blocks as the data buffer. A bus connector block is configured to manage bus arbitrating and address decoding, and particularly to create the direct data path between master blocks.

26 Claims, 10 Drawing Sheets

MULTI-MASTER BUS ARCHITECTURE FOR SYSTEM-ON-CHIP

CROSS-REFERENCE TO RELATED APPLICATIONS

This application is the National Stage of International App. No. PCT/EP2010/067545, filed Nov. 16, 2010, which claims priority to Chinese Patent App. No. 200910221860.7, filed on Nov. 18, 2009, and which are hereby incorporated by reference as if fully set forth herein.

TECHNICAL FIELD

The present invention relates generally to semi-conductor technologies and, more particularly, to multi-master bus architecture for system-on-chip designs.

BACKGROUND

The continued growth of the communications technologies and multimedia technologies has fueled the need for integrating more and more communication components, multimedia components, Digital Signal Processors (DSP) and general purpose processors into the System On Chip (SOC). Most of these components deal with data transferring or processing, and are operable to read data from a data pool or write data to a data pool. Such components that can initiate the transfer of data are called master blocks. Additionally, data pools, such as the memory or register groups, are called slave blocks

SUMMARY OF THE INVENTION

According to some embodiments of the present disclosure, a method for facilitating transfer of data between two or several master blocks through a bus on chip is provided. The method includes creating a direct path for data transferring from a master port of a bus to another master port of the same bus. The bus includes a plurality of signals used to transfer data, address or control information between two or several blocks on chip. The method also includes controlling the behavior of bus connector block according to the destination of data coming from a master port. The behavior of bus connector block includes the selection of sending data forward to the destination that is a slave port, or reserving data in the connector block until the destination that is a master port requests it.

According to some embodiments of the present disclosure, each master block is assigned a unique address region that is used to identify the unique master block as the source or destination of one master-to-master transfer of data. The unique address region can be a virtual address or an existing address to a bus on chip.

According to additional and alternative embodiments of the present disclosure, one master block writes data to a certain slave address while another master block reads data from the same slave address. The bus connector is operable to determine that the data is not really sent to the slave address but sent directly between the two master blocks.

According to additional and alternative embodiments of the present disclosure, there is provided an apparatus for implementing a method of master-to-master transfer of data. The apparatus includes a master-connector-slave arrangement that enables the direct data communication between two or several master blocks without allocating a slave block as the data buffer. The master block initiates the transfer of data through one master port. The slave block responds to the transfer of data through one slave port. The bus connector block manages bus arbitration and address decoding; and particularly, creates a direct data path between master blocks.

Embodiments of the present disclosure are configured to reduce the dummy transfer of data on a master-to-slave path and a slave-to-master path, when data is required to be transferred between two master blocks.

Embodiments of the present disclosure further are configured to create a direct path for data transferring from one master block to another master block on chip, without any slave block in between.

Embodiments of the present disclosure provide a bus connector block that can use the store-and-forward process to implement a master-to-master path on chip.

Additional and alternative embodiments provide a master-connector-slave arrangement that enables a high degree of efficiency in the bus on chip and enables an improved use of data throughput.

One or more of these embodiments are adapted for use in any general purpose of sac design, especially for high performance applications with many communication components and multimedia components. And embodiments of the present disclosure are compatible with existing industry standards.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged data communications network.

In order to support compatibility and inter-operability between master blocks and slave blocks produced by different manufacturers, industry standards have been developed and accepted. In the field of ARM-based SOC (system-on-chip), most agreed standard include Advanced Microcontroller Bus Architecture (AMBA) and Advanced Extensible Interface (AXI).

Figure 1:
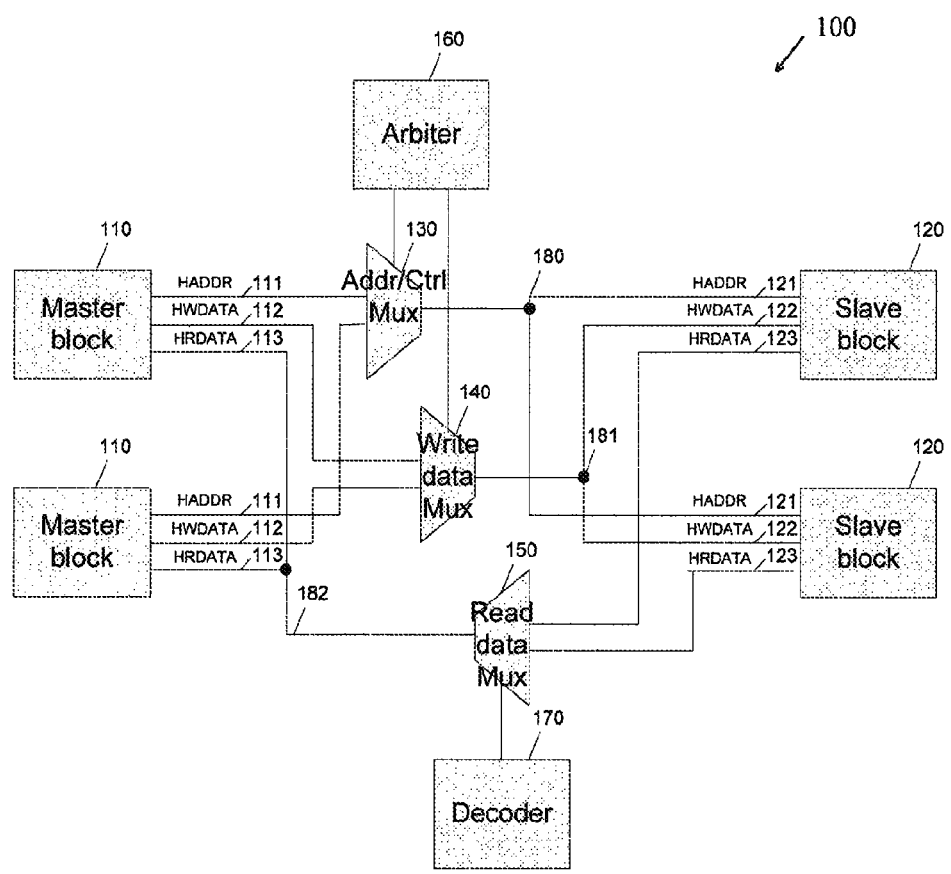
FIG. 1 illustrates a schematic diagram of an AMBA AHB arrangement.

FIG. 1 illustrates an AMBA ARB system 100. Two blocks are designated as 'master' 110, each of which include a group of address/control out ports 111, a group of "writing data out" ports 112 and a group of "reading data in" ports 113. Two other blocks are designated as 'slave' 120, each of which include a group of address/control in ports 121, a group of writing data in ports 122 and a group of reading data out ports 123. The address/control signals originating at each master block 110 are multiplexed through a MUX 130 to provide a bus 180 that terminates at the slave blocks 120. The writing data originating at each master block 110 are multiplexed through a second MUX 140 to provide a second bus 181 that terminates at the slave blocks 120.

The reading data originating at each slave block 120 are multiplexed through a third MUX 150 to provide a third bus 182 that terminates at the master blocks 110. A central arbiter 160 and a central address decoder 170 allow a single transfer of data at any given time.

Figure 2:
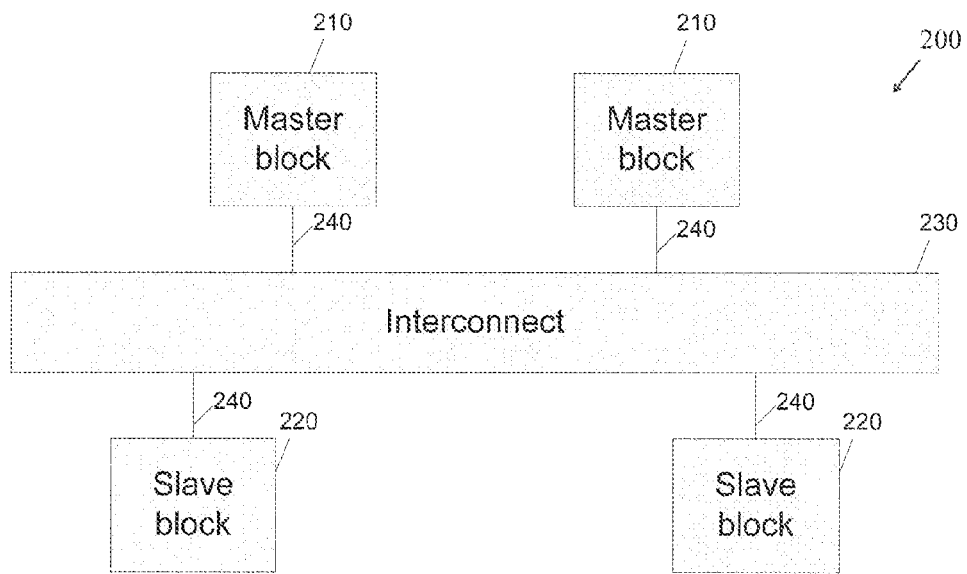
FIG. 2 illustrates a schematic diagram of AXI arrangement.

FIG. 2 illustrates an exemplary AXI system. The AXI 200 includes two master blocks 210 and two slave blocks 220. The AXI includes an interconnect block 230 that is coupled to the master blocks 210 and slave blocks 220. Between master blocks 210 (or slave blocks 220) and interconnect 230 are a group of channels 240, each of which contain valid/ready signals and one kind of address, data, response signals.

Figure 3:
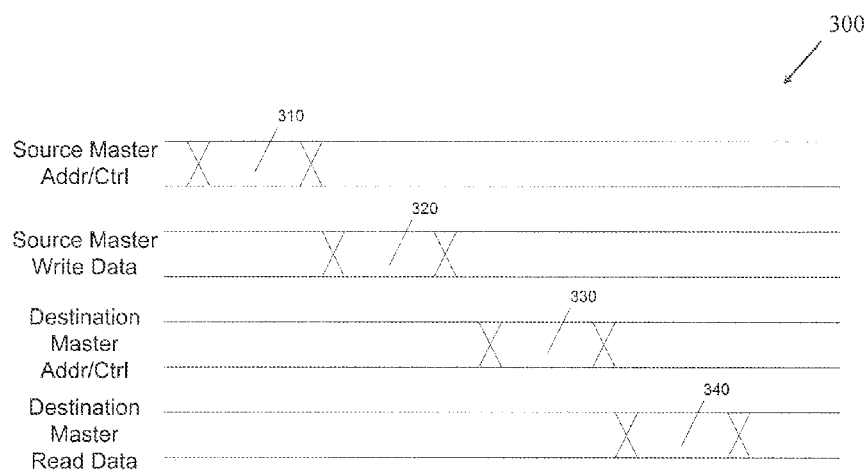
FIG. 3 illustrates a time diagram for a bus on chip, in an AMBA AHB or AXI arrangement, wherein data is transferring from a master block to another master block, via a slave block.

FIG. 3 illustrates a timing diagram for a bus on chip, in an AMBA ARB 100 or AXI 200 arrangement, wherein data is transferring from a master block referenced as 'source' to another master block referenced as 'destination', via a slave block. In the first timing phase 310, the source master block transmits the address of the slave block and the write control signals in its address/control port. In the second timing phase 320, the source master block transmits data in its "writing data out" port to a slave block. In the third timing phase 330, the destination master block transmits the address of the slave block and the read control signals in its address/control port. In the forth timing phase 340, the destination master block receives data in its "reading data in" port from a slave block. The third timing phase 330 and the forth timing phase 340 should be later than the first timing phase 310 and the second timing phase 320.

In either the AMBA ARB system 100 or the AXI system 200, data can only be transferred between one master block and one slave block. Even in the situation that the output of one master block, referred to as a source, is writing to the required input of another master block, referred to as a destination, the data still needs to be written first to a slave block, called a buffer, and then read by the destination master block. This apparatus takes more time to accomplish one transfer of data. Especially when such master-to-master transfer is constant and enormous, the efficiency of the bus is damaged by two continual master-to-slave transfers.

A number of solutions that increase the efficiency of the bus have been proposed. In one, discussed in United States Patent Application Publication, Pub. No.: US 2003/0043790 AI, the contents of which hereby are incorporated by reference in their entirety, a plurality of multiplexers and a plurality of isolated data paths are added between each bus blocks. This allows any bus master block to communicate with any bus slave block without any blocking in the bus. But this method still needs to take a slave block as a buffer in a mater-to-master transfer and increase the complexity of the bus. In another, discussed in United States Patent, U.S. Pat. No. 7,340,548 B2, the contents of which hereby are incorporated by reference in their entirety, an independent bus topology portion of an on-chip bus is presented, with transfer of data in the form of packets. This method introduces the computer network technology to SOC, requires all the data to be capsulated in the packets before transferred, which also increase the complexity of the bus.

Figure 4:
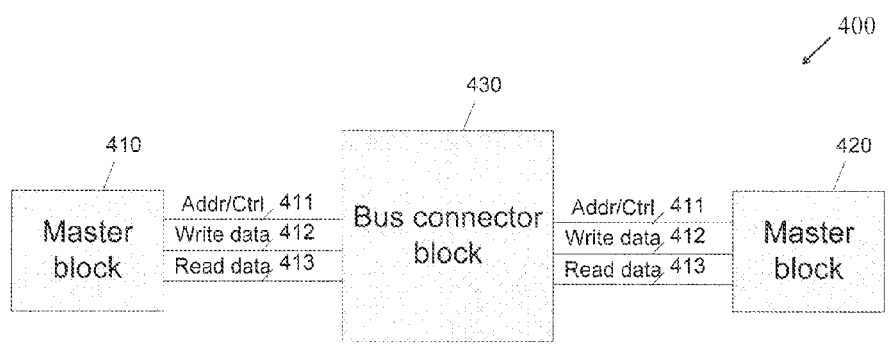
FIG. 4 illustrates a schematic depiction of a master-to-master direct path according to some embodiments of the present disclosure.

FIG. 4 illustrates a simplified schematic diagram of a master-to-master direct path according to embodiments of the present disclosure. The embodiment of the master-to-master direct path 400 shown in FIG. 4 is for illustration only and other embodiments could be used without departing from the scope of this disclosure.

A master-to-master direct path 400 includes a number of communication components, such as, but not limited to, multimedia components, Digital Signal Processors (DSP) and general purpose processors into the System On Chip (SOC). These communications components can deal with data transferring or processing, and are operable to read data from a data pool or write data to a data pool. Such components that can initiate the transfer of data are referred to as master blocks. Additionally, data pools, such as the memory or register groups, are called slave blocks. The master-to-master direct path includes a first master block 410, a second master block 420 and a bus connector block 430. Connecting each master block 410, 420 and bus connector block 430 are a group of address/control signals 411, a group of writing data signals 412, and a group of reading data signals 413, each of which comprise at least several dependent signals.

Data originates from the first master block 410, also referred herein as a 'source master block.' The data originating at the source 410 is destined for the second master block 420, also referred herein as a 'destination master block.' The bus connector block 430 applies a store-and-forward process to the data without being passed through any slave blocks. Using the store-and-forward process, data is stored first temporarily on the bus connector block 430. Thereafter, at a time subsequent to the temporary storing of the data on the bus connector, the data is sent forward to the destination master block 420. (The master-slave block interconnections are discussed in further details herein below with respect to FIG. 10).

In one embodiment, each master block 410, 420 is assigned a unique address region. On the view of the source master block 410, data is written to the unique address of the destination master block 420; and on the view of the destination master block 420, data is read from the source master block 410.

In another embodiment each master block 410,420 takes the data to/from (e.g., writes data to and/or reads data from) the same address of a slave. The data is not stored in the slave address; rather the bus connector 430 creates a master-to-master direct path with the slave address as the destination. On the view of both master blocks, data is transferring to/from a normal slave address. The slave address is the address of a slave block that can be a virtual address or an existing address.

Figure 5:
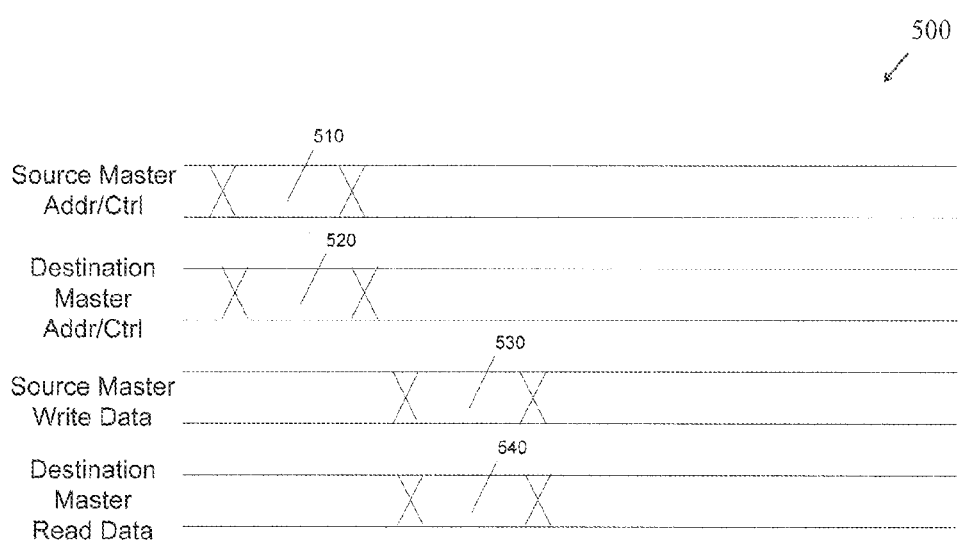
FIG. 5 illustrates a timing diagram of a bus on chip wherein data is transferring between two master blocks according to some embodiments of the present disclosure.

FIG. 5 illustrates a timing diagram of a bus on chip wherein data is transferring between two master blocks according to embodiments of the present disclosure. The embodiment of the timing diagram 500 shown in FIG. 5 is for illustration only and other embodiments could be used without departing from the scope of this disclosure.

In the first timing phase 510, the source master block transmits the address of the destination and the write control signals in its address/control port. In the second timing phase 520, the destination master block transmits the address of the source and the read control signals in its address/control port. In some embodiments, the first timing phase 510 can overlap with parts or all of the second timing phase 520. In the third timing phase 530, the source master block transmits data in its writing port. In the forth timing phase 540, the destination master block receives data in its reading port. In some embodiments, the forth timing phase 540 can occur during the same time as the third timing phase 530 (e.g., similar to a FIFO operation), or several cycles later, with a delayed time depending upon the length of pipeline in the bus connector block.

Figure 6:
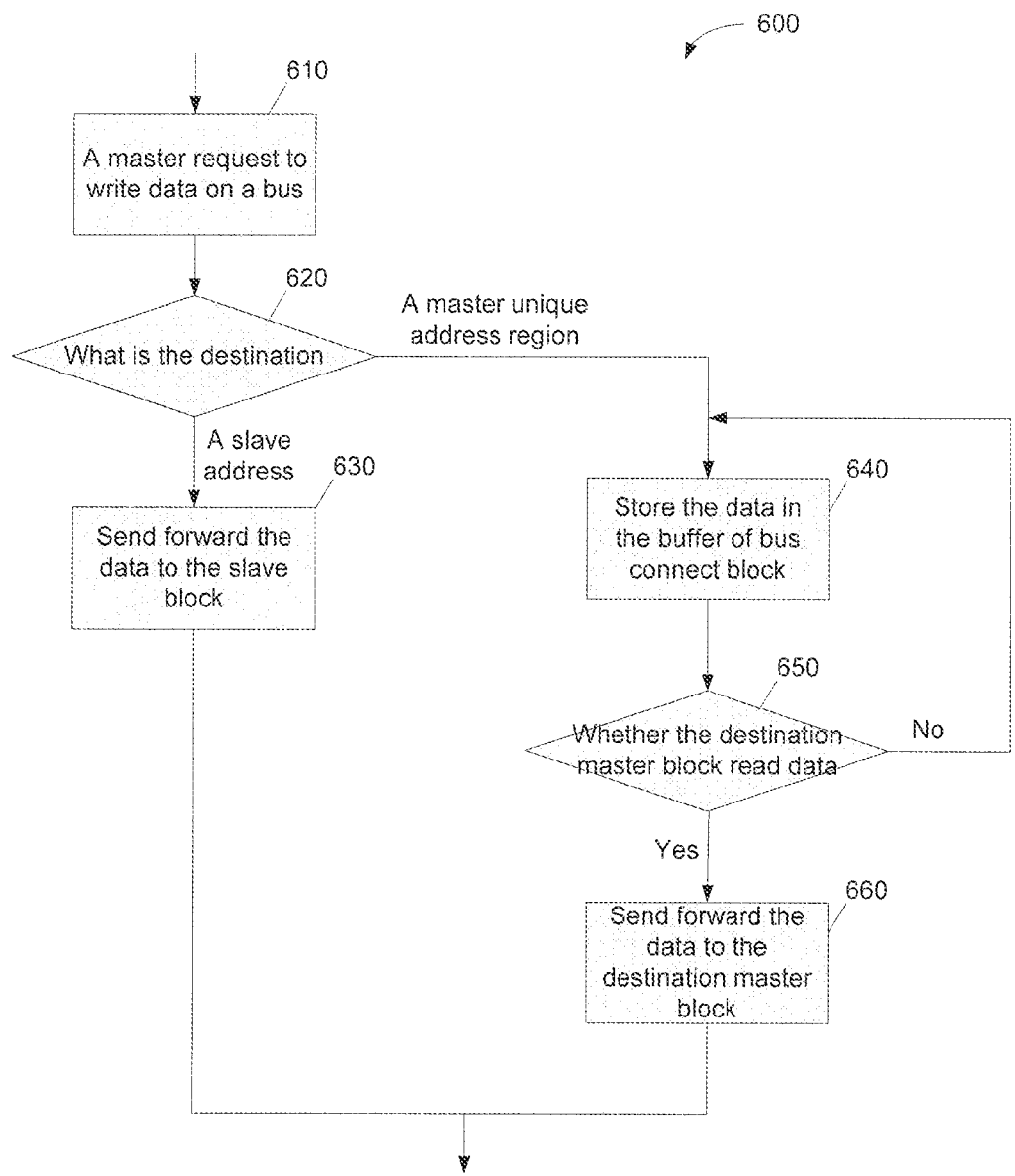
FIG. 6 illustrates a flow diagram for the writing behavior of a bus connector block according to some embodiments of the present disclosure.

FIG. 6 illustrates a flow diagram for the writing behavior of a bus connector block according to embodiments of the present disclosure. The embodiment of the flow diagram 600 shown in FIG. 6 is for illustration only and other embodiments could be used without departing from the scope of this disclosure.

The process 600 relates to a transfer of data with the writing request from a master block. At the beginning process in step 610, the bus connector receives a writing request. Thereafter, the bus connector decides (e. g., determines) in step 620 the destination of the data. In step 620, the bus connector determines whether the request destination is a master unique address region or a slave region. If the request destination is a slave region, the writing process proceeds to a normal master-to-slave process in step 630. In step 630, the bus connector sends forward the data to the slave block. If the request destination is a master unique address region, the writing process goes on to the master-to-master process in step 640, wherein the bus connector stores the data in its buffer. Thereafter, in step 650, the bus connector decides (e. g., determines) whether the destination master block reads data from the unique address of the writing master block or not. If the answer is "no" in step 650, the bus connector waits and returns to step 640. If the answer is "yes", the writing process proceeds to step 660. In step 660, the bus connector sends forward the data to the destination master block.

Figure 7:
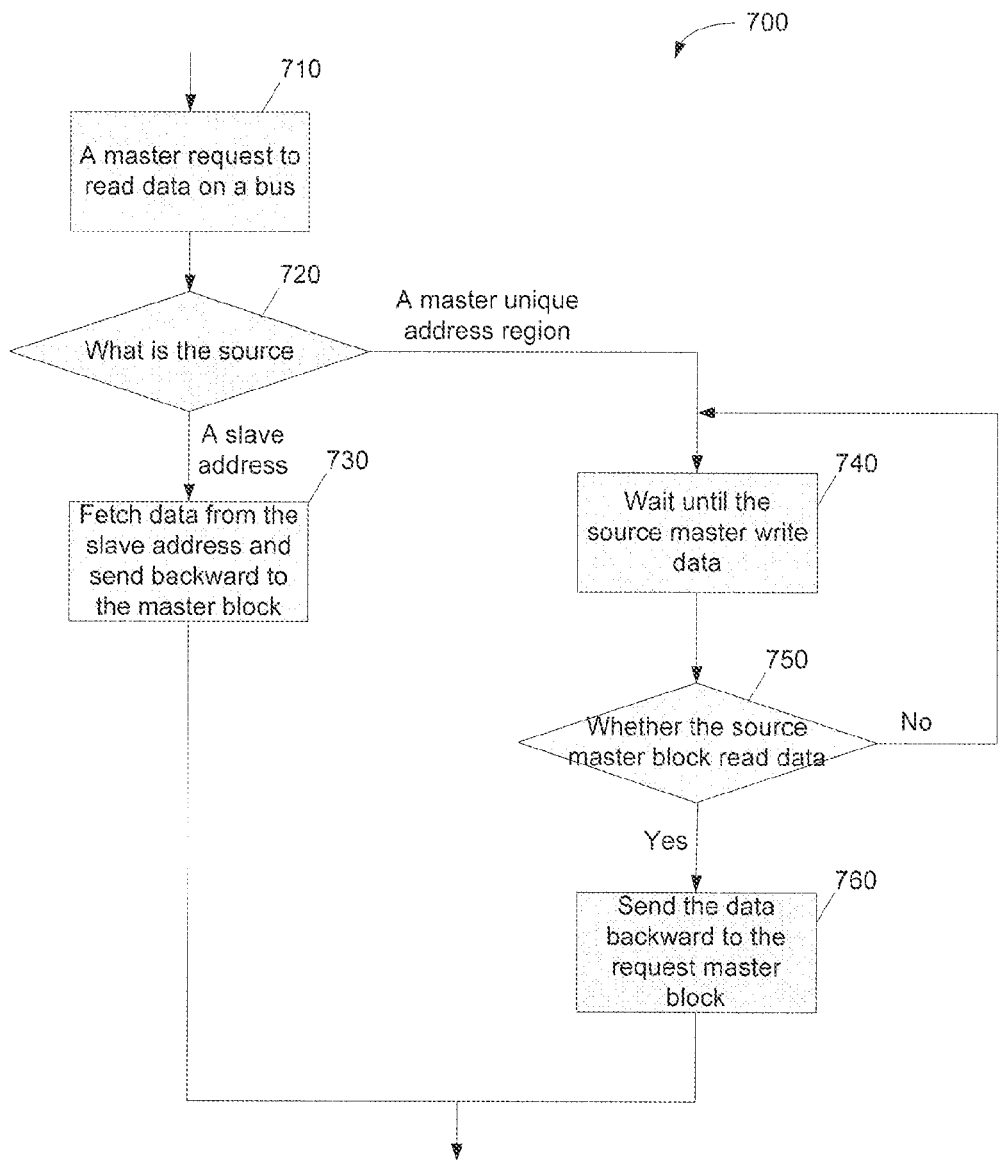
FIG. 7 illustrates a flow diagram for the reading behavior of a bus connector block according to some embodiments of the present disclosure.

FIG. 7 illustrates a flow diagram for the reading behavior of a bus connector block according to embodiments of the present disclosure. The embodiment of the flow diagram 700 shown in FIG. 7 is for illustration only and other embodiments could be used without departing from the scope of this disclosure.

The process 700 relates to a transfer of data with the reading request from a master block. The process begins at step 710 wherein the bus connector receives a reading request. Thereafter, the bus connector decides (e.g., determines) 720 what the source is. In step 720, the bus connector determines whether the request source is a master unique address region or a slave region. If the request source is a slave region, the reading process proceeds to a normal slave-to-master process in step 730. In step 730, the bus connector fetches data from the slave block and sends the data backward to the reading master block. If the request source is a master unique address region, the reading process proceeds to the master-to-master process 740, wherein the bus connector just waits until the source master writes data. Thereafter, the bus connector, in step 750, decides (e.g., determines) whether the source master block has writen data to the unique address of the reading master block or not. If the answer is "no", the bus connector returns to step 740 wherein the bus connector continues to determine and wait. If the answer in step 740 is "yes", the reading process proceeds to step 760. In step 760, the bus connector receives the data from the source master block and sends the data backward to the reading master block.

Figure 8:
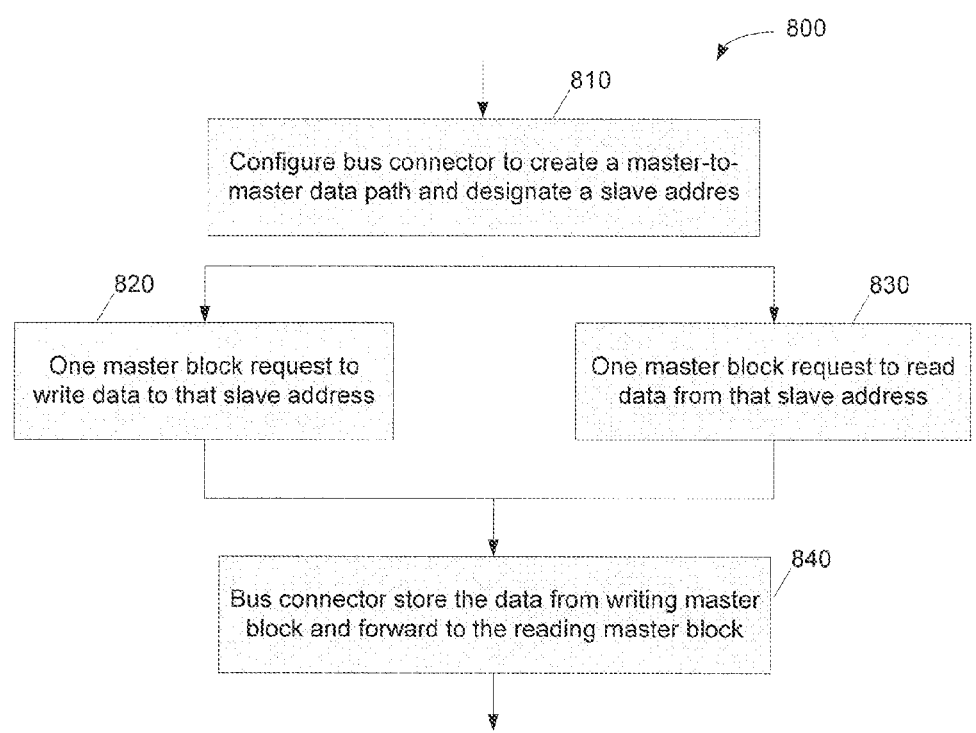
FIG. 8 illustrates a flow diagram for the behavior of a bus connector block according to some embodiments of the present disclosure.

FIG. 8 illustrates a flow diagram for the behavior of a bus connector block according to embodiments of the present disclosure. The embodiment of the flow diagram 800 shown in FIG. 8 is for illustration only and other embodiments could be used without departing from the scope of this disclosure.

The process 800 relates to a transfer of data between two master blocks. In the process 800, the bus connector is pre-configured and the master blocks regard the data as transferring to a normal slave address. The process begins at step 810. In step 810, the bus connector is pre-configured, by software or hardware, to create a master-to-master path and a slave address is designated as the virtual target in the transfer of data. In step 820, the bus connector receives a request to write data to the slave address (i.e., to the slave address designated as the virtual target). The bus connector also receives a request to read data from this slave address in step 830. Thereafter, the bus connector proceeds to step 840. In step 840, the bus connector stores the data from writing master block and forwards the data to the reading master block.

Figure 9:
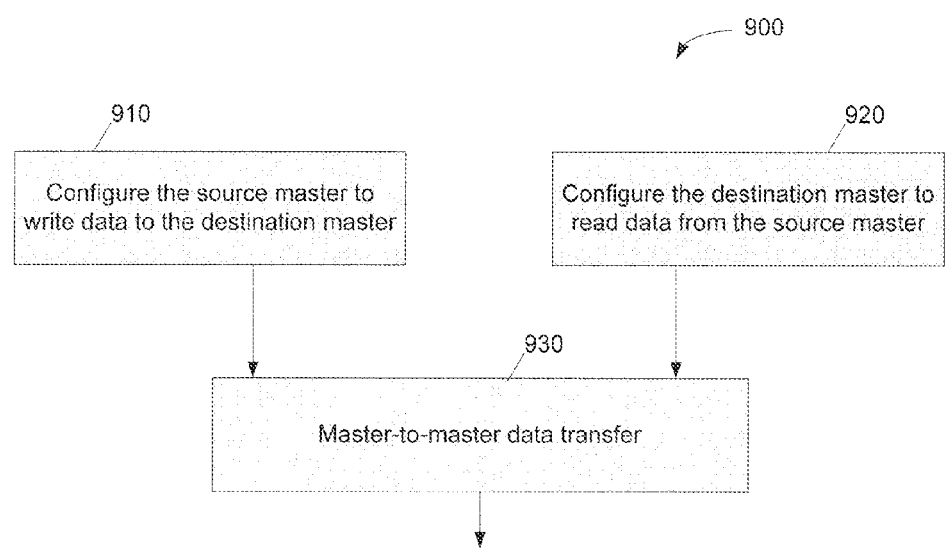
FIG. 9 illustrates a flow diagram of the master-connector-slave system according to some embodiments of the present disclosure.

FIG. 9 illustrates an example flow diagram of the master-connector-slave system according to embodiments of the present disclosure. The embodiment of the flow diagram 900 shown in FIG. 9 is for illustration only and other embodiments could be used without departing from the scope of this disclosure.

In step 910, the first master block (e.g., the source master block) is configured to write data to the second master (e.g., the destination master block). In step 920, the destination master block is configured to read data from the source master block. The configuration in both processes can performed using hardware or software. The sequence of these two processes can be arbitrary. After steps 910 and 920, the process proceeds to step 930 wherein a master-to-master transfer of data begins.

Figure 10:
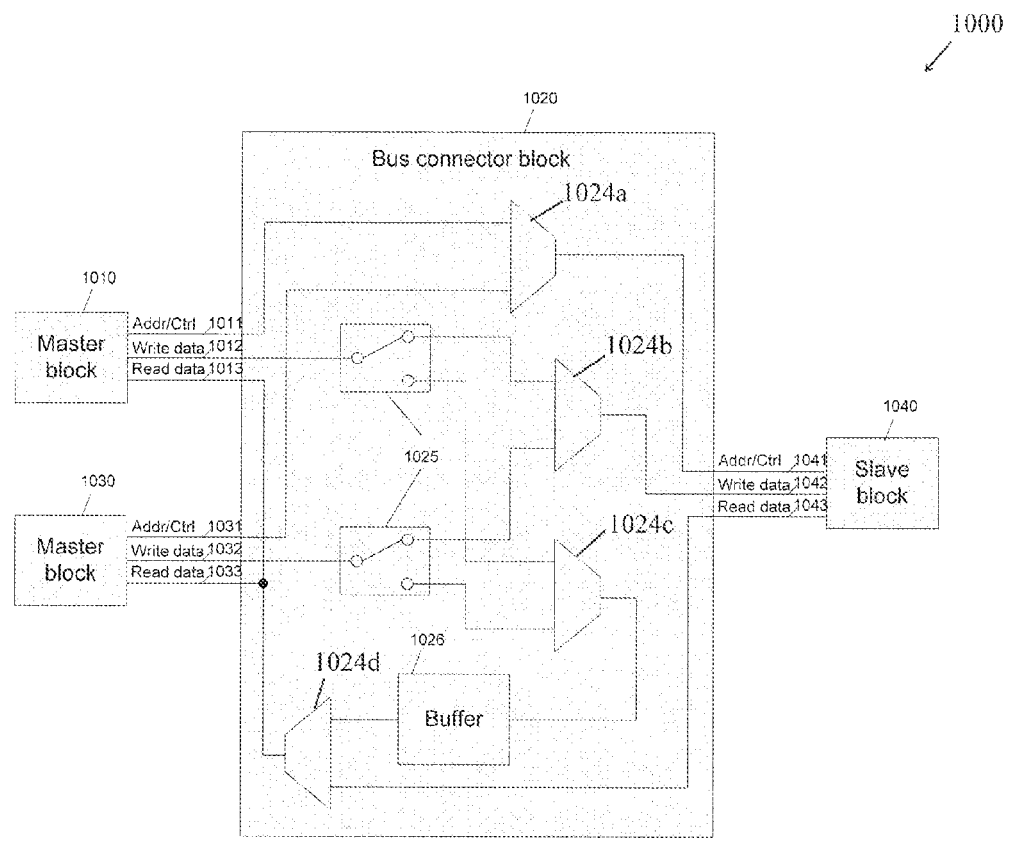
FIG. 10 illustrates a master-connector-slave arrangement according to some embodiments of the present disclosure.

FIG. 10 illustrates an example of the master-connector-slave arrangement according to embodiments of the present disclosure. The embodiment of the master-connector-slave arrangement 1000 shown in FIG. 10 is for illustration only and other embodiments could be used without departing from the scope of this disclosure.

A first master block 1010, a second master block 1030 and a slave block 1040 are coupled with a group of address/control signals, writing data signals and reading data signals to the bus connector 1020. The bus connector 1020 includes a group of multiplexers 1024a-d, routing switches 1025 and buffer 1026. The group of multiplexers 1024a-d and routing switches 1025 are used to connect the writing data from each master blocks 1010, 1030 to the slave block 1040 or to the buffer 1026. It will be understood that the conventional function parts inside the bus connector 1020, such as bus arbitrator, address decoder and some other bus multiplexers are not specifically illustrated but are connected to control the muxes and switches. The arrangement 1000 is compatible to the AMBA ARB standard and AXI standard.

For example, if the master block 1010 intends to write data to the slave block 1040, the address signals 1011 carry the address of the slave block 1040 to the bus connector 1020. Thereafter, the bus connector 1020 forwards the address information via multiplexer 1024a and the address signals 1041 while the multiplexer 1024b and a first switch 1025 create a path to connect two writing data signals 1012 and 1042.

In some embodiments, each master block 1010, 1030 is assigned a unique address region. For example, if the master block 1010 intends to write data to the master block 1030, the address signals 1011 carries the unique address of destination master block 1030 to the bus connector 1020. Thereafter, the multiplexer 1024c and the first switch 1025 create a path to connect the writing data signals 1012 to the buffer 1026. Thereafter, the data is stored in the buffer 1026 temporarily. If the master block 1030 intends to read data from the master block 1010, the address signals 1031 carries the unique address of source master block 1010 to the bus connector 1020, then the data in the buffer is sent forward to the master 1030 via multiplexer 1024d.

In additional and alternative embodiments, the bus connector 1020 is configured to determine that the data is not really sent to the slave address but sent directly between the two master blocks 1010, 1030. For example, if the master block 1010 intends to write data to the master block 1030, the bus connector 1020 is pre-configured to create a direct path for the two master blocks 1010, 1030. Both the address signals 1011, 1031 carry the same slave address to the bus connector 1020. The direct path comprises a multiplexer 1024c-d, switch 1025, and buffer 1026. The direct path connects the writing data signals 1012 to the reading data signals 1033.

It should be understood that the present disclosure is to be considered an exemplification of the principles of the invention and is not intended to limit the spirit or scope of the invention and/or claims of the embodiments illustrated. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for facilitating transfer of data between two components through a bus on chip, comprising:
   a) selectively creating a data path for data transferring between a first master port of a bus and a second master port of the same bus in undivided bus transactions, wherein data transferred between the first and second master ports is not stored in a slave device; and
   b) controlling connectivity in a bus connector block to selectively create the data path according to the destination of data received from the first master port.

2. The method of claim 1, wherein the bus comprises a plurality of signals used to transfer one of data, address and control information between at least two components on chip.

3. The method of claim 1, wherein the first master port of the bus comprises a port coupled to a first component that initiates the transfer of data through the bus.

4. The method of claim 1, wherein the data path comprises the data communication between at least two components without using a data pool as a data buffer.

5. The method of claim 1, wherein the destination of data is at least one of the second component and a data pool.

6. The method of claim 1, wherein the step of controlling the connectivity in the bus connector block comprises at least one of: sending data forward to a first destination; and reserving data in the bus connector block until a second destination that is the second component requests it.

7. The method of claim 1, wherein the bus connector block is configured to manage bus arbitration and address decoding.

8. The method of claim 1, further comprising storing the data on the bus connector block temporarily and, after a time subsequent, sending the data forward to the destination.

9. The method of claim 1, wherein the first and second components include a unique address region corresponding to a respective unique ID.

10. The method of claim 1, wherein the bus connector block is pre-configured based on at least one of software and hardware.

11. The method of claim 7, wherein the bus connector block is further configured to create the data path between master blocks.

12. The method of claim 9, wherein the unique address region is at least one of a virtual address and an existing address.

13. An apparatus for use in transferring data in a system on chip, the apparatus comprising:
   a plurality of master blocks; and
   a bus connector block coupled to the plurality of master blocks, wherein the bus connector block is configured to create a data path for transferring data between a first master port of the bus connector block coupled to a first master block of the plurality of master blocks and a second master port of the bus connector block coupled to a second master block of the plurality of master blocks in undivided bus transactions, wherein data transferred between the first and second master blocks is not stored in a slave device.

14. The apparatus of claim 13, wherein said bus connector block comprises at least one of a single block in a chip, and a plurality of functional blocks in a chip.

15. The apparatus of claim 13, wherein the first master block of the plurality of master blocks initiates the transfer of data through the first master port.

16. The apparatus of claim 13, wherein the bus connector block is configured to manage bus arbitration and address decoding.

17. The apparatus of claim 13, wherein the bus connector block is configured to operate a store-and-forward process, wherein the store-and-forward process stores the data on the bus connector block temporarily and then sends the data forward to the destination.

18. The apparatus of claim 13, wherein the plurality of master blocks each include a unique address region corresponding to a respective unique ID.

19. The apparatus of claim 16, wherein the bus connector block is further configured to create the data path between the plurality of master blocks.

20. A system on chip, the system comprising:
   a plurality of master blocks; and
   a bus connector block coupled to the plurality of master blocks, wherein the bus connector block is configured to create a data path for transferring data between a first master port of the bus connector block coupled to a first master block of the plurality of master blocks and a second master port of the bus connector block coupled to a second master block of the plurality of master blocks in undivided bus transactions, wherein data transferred between the first and second master blocks is not stored in a slave device.

21. The system of claim 20, wherein said bus connector block comprises at least one of a single block on the system on chip, and a plurality of functional blocks on the system on chip.

22. The system of claim 20, wherein a first master block of the plurality of master blocks initiates the transfer of data through the first master port.

23. The system of claim 20, wherein the bus connector block is configured to manage bus arbitration and address decoding.

24. The system of claim 20, wherein the bus connector block further is configured to create the data path between master blocks.

25. The system of claim 20, wherein the bus connector block is configured to store the data on the bus connector block temporarily and then sends the data forward to the destination.

26. The system of claim 20, wherein the plurality of master blocks each include a unique address region corresponding to a respective unique ID.

* * * * *